United States Patent [19]

Negi et al.

[11] 4,258,420

[45] Mar. 24, 1981

[54] CONTROL FILE APPARATUS FOR A DATA PROCESSING SYSTEM

[75] Inventors: Virendra S. Negi, Pepperell; Arthur Peters, Sudbury, both of Mass.

[73] Assignee: Honeywell Information Systems Inc., Waltham, Mass.

[21] Appl. No.: 733

[22] Filed: Jan. 3, 1979

[51] Int. Cl.³ .............................................. G06F 9/38
[52] U.S. Cl. .................................................. 364/200
[58] Field of Search ... 364/200 MS File, 900 MS File

[56] References Cited

U.S. PATENT DOCUMENTS

| 3,317,898 | 5/1967 | Hellerman | 364/200 |
| 4,104,720 | 8/1978 | Gruner | 364/200 |
| 4,149,243 | 4/1979 | Wallis | 364/200 |
| 4,168,523 | 9/1979 | Chari et al. | 364/200 |

Primary Examiner—Mark E. Nusbaum
Assistant Examiner—Thomas M. Heckler
Attorney, Agent, or Firm—John S. Solakian; Nicholas Prasinos; William W. Holloway, Jr.

[57] ABSTRACT

Information from a main data processor is transferred to an auxiliary data processor of the system and is stored in a control file which may be addressed by either a firm ware word from a control store or by use of the function code received in an instruction from the main processor. Information in such control file is used for the purpose of addressing main memory. The address for main memory may be incremented or decremented simultaneously as operands are being fetched from main memory for execution.

11 Claims, 10 Drawing Figures

|   | UPPER | LOWER |
|---|---|---|
| 0 | BUL | UL0 |
| 1 | EDT0 | UL1 |
| 2 | CM | UL2 |
| 3 | EDT1 | TASK |
| 4 | | EA1 |
| 5 | EDT2 | R4 |
| 6 | | WL0 |
| 7 | EDT3 | DD1 |
| 8 | | EA2 |
| 9 | EDT4 | R5 |
| A | | WL1 |
| B | EDT5 | DD2 |
| C | | EA3 |
| D | EDT6 | R6 |
| E | | WL2 |
| F | EDT7 | DD3 |

Bits 0-7 UPPER, 8-23 LOWER

BANK 1 RELATED TO DD1 (locations 4-7)
BANK 2 RELATED TO DD2 (locations 8-B)
BANK 3 RELATED TO DD3 (locations C-F)

FIG. 9

MAR/MSR OR RFCWRT: bits 24 25 26 27
RFCAD: bits 28 29 30 31

| FIELD DECODE | MICRO-INSTRUCTION |
|---|---|
| 0000 | NOT USED |
| 0001 | MSRSR |
| 0010 | MSRSL |
| 0011 | MSRLD |
| 0100 | CPRLD |
| 0101 | MRADD |
| 0110 | MRSUB |
| 0111 | MRFRF |
| 1000 | NOT USED |
| 1001 | CUFBI |
| 1010 | CLFBI |
| 1011 | CFMR |
| 1100 | NOT USED |
| 1101 | CUFBX |
| 1110 | CLFBX |
| 1111 | NOT USED |

CONTROL FILE APPARATUS FOR A DATA PROCESSING SYSTEM

RELATED APPLICATIONS

The following applications are incorporated by reference to the instant application.

1. "Binary Coded Decimal Correction Apparatus" invented by Virendra S. Negi and Arthur Peters, filed on even date herewith and having Ser. No. 000,735 and assigned to the same assignee named herein.

2. "Arithmetic Logic Apparatus for a Data Processing System" invented by Virendra S. Negi and Arthur Peters, filed on even date herewith and having Ser. No. 000,842 and assigned to the same assignee named herein.

3. "Control Store Address Generation Logic for a Data Processing System" invented by Arthur Peters and Virendra S. Negi, filed on even date herewith and having Ser. No. 000,864 and assigned to the same assignee named herein.

BACKGROUND OF THE INVENTION

The present invention generally relates to data processing systems and more particularly to control file apparatus associated therewith.

In data processing systems having a so-called main data processor and a so-called auxiliary data processor, instructions and/or data are received from the main data processor by the auxiliary data processor, which data and/or instructions must be loaded in a suitable storage location in the auxiliary data processor. It is desirable that this loading of information be provided in predetermined locations so as to be available to the user without any need to search for such information. It is also desirable to, simultaneously with the loading of information into such storage locations, enable the addressing of main memory associated with such system independent of the other operations within such auxiliary processor, thereby enabling the simultaneous manipulation of the data or information in the auxiliary processor and the addressing of the main memory.

It is accordingly a primary object of the present invention to provide a data processing system having an improved control file architecture.

SUMMARY OF THE INVENTION

The above stated object and other objects are achieved according to the present invention by providing a data processing system which includes a first data processor (central processing unit) and a second data processor (referred to herein as a "commericial instruction processor"—CIP) and apparatus for coupling the first and second data processors for receipt of data and instructions by the second data processor from the first data processor. Also provided in such system is a main memory for storing information. The second data processor (CIP) includes a control store having a plurality of commands stored therein operative to control the operation of the second data processor and apparatus for storing a function code included in an instruction received by the second data processor from the first data processor. The second data processor also includes a control file which includes a plurality of locations for storing the data received from the first data processor, as well as apparatus for addressing a location in the control file with either a command from the control store or a function code received by the apparatus for storing data from the first data processor. Further apparatus is provided for addressing the main memory with the contents of the location addressed by the apparatus for addressing. In addition, apparatus is provided which is responsive to the apparatus for addressing, for fetching information from the main memory for use by the second data processor. Further apparatus is included in the second data processor for changing the value of the contents of the location addressed by the apparatus for addressing simultaneously with the operation of the apparatus for fetching.

BRIEF DESCRIPTION OF THE DRAWINGS

The above and other objects of the present invention are achieved in the illustrative embodiment as described with respect to the drawings in which.

DETAILED DESCRIPTION OF THE PREFERRED EMBODIMENT(S)

Figure 1:
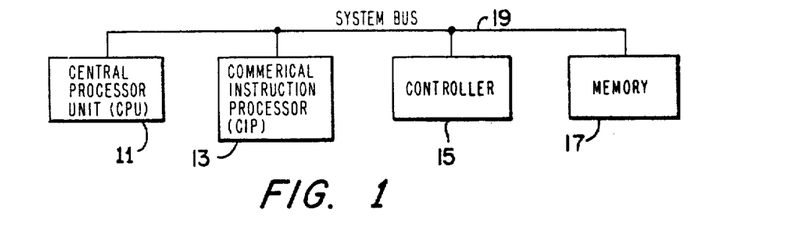
FIG. 1 illustrates the overall system configuration with incorporates the present invention.

Referring to FIG. 1, a commercial instruction processor (CIP) 13 is provided to expand the instruction set capabilities of CPU 11 by using a poweful set of commercial type instructions. These instruction types allow the CPU, via the CIP, to process decimal and alphanumeric data; the instruction types are listed as follows: Decimal, Alphanumeric, Data Conversion and Editing. CIP communication with the CPU and main memory 17 is over a common system bus 19. The CIP operates as an attachment to the CPU and receives instructions and operands as transfers from the CPU and/or memory. The CIP executes the commercial instructions as they are sent over the bus 19 by the CPU 11. The CPU obtains these instructions from main memory, examining each fetched instruction specifically for a commercial instruction. Receipt of each commercial instruction by the CIP is usually concurrent with the CPU, as the CPU extracts and decodes each instruction from memory. However, CIP instruction execution is asynchronous with CPU operations. Any attempt to execute a commercial instruction when a CIP is not installed in the system causes the CPU to enter a specific trap condition.

The CIP receives information from the CPU and main memory via the bus 19, and processes this information in a logical sequence. This sequence consists of four CIP operational states as follows: idle state, load state, busy state and trap state.

Figure 2:
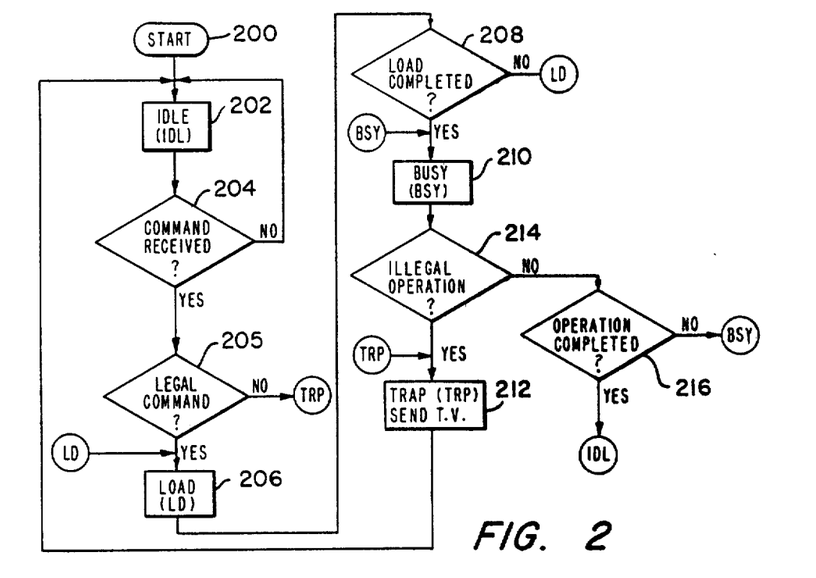
FIG. 2 is an operational sequence state diagram of the CIP processor of the present invention.

As shown in FIG. 2, the CIP enters block 200 and remains in the idle state (block 202) when not processing information, and must be in the idle state to accept a command (i.e., a CIP instruction or an I/O command) from the CPU. On receipt of a command (block 204), if legal (block 205), the CIP enters the load state (block 206) and remains in the load state until all associated command information is received. When this information is successfully recieved (block 208), the CIP enters the busy state (block 210) to process the information. Any further attempts by the CPU to communicate with the CIP while in its busy state are not acknowledged by the CIP until it returns to the idle state again. CIP processing includes the communication activity with main memory that occurs when fetching the necessary operand(s). The CIP enters the trap state (block 212) only when specific illegal events occur (block 214), such as detection of an illegal operand length or an out of sequence command. Return is made to the idle state if the operation has been completed (block 216).

All pertinent instruction transfers to the CIP are performed jointly by the CPU and CIP. They are decoded and sent by the CPU to the CIP along with all of the pertinent information required for execution of the instruction. When the transfer of the information is completed, the CPU and CIP continue to process their respective instructions. Each CIP instruction contains a 16-bit wide instruction word that is immediately followed with up to six additional descriptive type words (also 16-bits wide), called data descriptors and labels. The instruction word contains the CIP op-code that is sent to the CIP for processing. The data descriptors describe the operand type, size, and location in memory; the label provides the address of a remote data descriptor. Both the data descriptor and the label are processed by the CPU; related information derived by this action, such as an operand type and memory address, is sent to the CIP for processing. The CPU accomplishes the preceding by analyzing the op-code that is contained in each instruction. When the CPU detects a CIP instruction (i.e., if the CIP is in the idle state), the CPU sends the instruction op-code and the related information in the following manner: (i) the CPU sends the op-code (i.e., the first word of the commercial instruction) to the CIP and the CIP enters the load state when it accepts the op-code; (ii) The CPU fetches the first data descriptor and interrogates the address syllable to generate the effective address; (iii) The CPU sends the following information: the 24-bit effective byte address of the first operand, the contents of the pertinent CPU data register, if applicable, and the data descriptor of the first operand, updated to reflect a byte (eight bits) or half-byte (four bits) digit position within a word; as second and third operands are encountered, the CPU performs the applicable procedures in steps ii and iii.

At this point, the CIP is loaded with all of the necessary information required to execute the commercial instruction and enters the busy state to execute the instruction. When necessary, the CIP communicates directly with main memory to obtain the applicable operand(s). However, it should be noted that the CIP never directly accesses any CPU registers. It only uses information sent to it by the CPU. Hence, no CPU registers are modified by the CIP and the CPU continues to process the next and each succeeding CPU instruction until one of the following conditions occurrs: (i) the CIP, via a trap vector (TV), notifies the CPU that an illegal event occurred during the execution of the current commercial instruction; or (ii) an internal or external interrupt signal is detected by the CPU.

When an interrupt signal is detected by the CPU, the CPU responds in the following manner. The CPU determines whether or not the last commercial instruction was completed by the CIP. The CPU waits for completion of the last commercial instruction. When the last commercial instruction is completed, the CPU determines if it resulted in a trap request. If it did, the CPU honors the trap request before performing the interrupt. This results in a typical context save/restore operation to store all relevant CPU and CIP status information, as required. With the completion of the CPU operations required to process a CIP trap request, or when there is no trap request and a CIP instruction is available for processing, the CPU performs the following. The CPU updates its program counter to point to the commercial instruction it was attempting to initiate. The CPU defers the attempt to process the commercial instruction until the current interrupt is serviced. The CPU honors and services the interrupt caused by the external device.

As the CIP executes an instruction, all CPU registers, including those referenced by the current commercial instruction, can be altered by a program via CPU instructions. However, the software must not modify the operand for a commercial instruction until the CIP is through processing that instruction; otherwise, unspecified results will occur. Branch instructions included in the CIP instruction repertoire are executed synchronously by the CPU and the CIP.

The three types of data that make up the data words processed by the CIP are Alphanumeric Data, Binary Data and Decimal Data. Each data type is classified into units of binary information. By definition this unit, when used to reference alphanumeric and binary data characters equals eight bits (one byte); when used to reference decimal data characters, it equals four bits (half byte) for packed decimal data and eight bits (one byte) for string decimal data. Also, single precision binary numbers consist of two units (two bytes) and double precision binary numbers consist of four units (four bytes).

Figure 3:
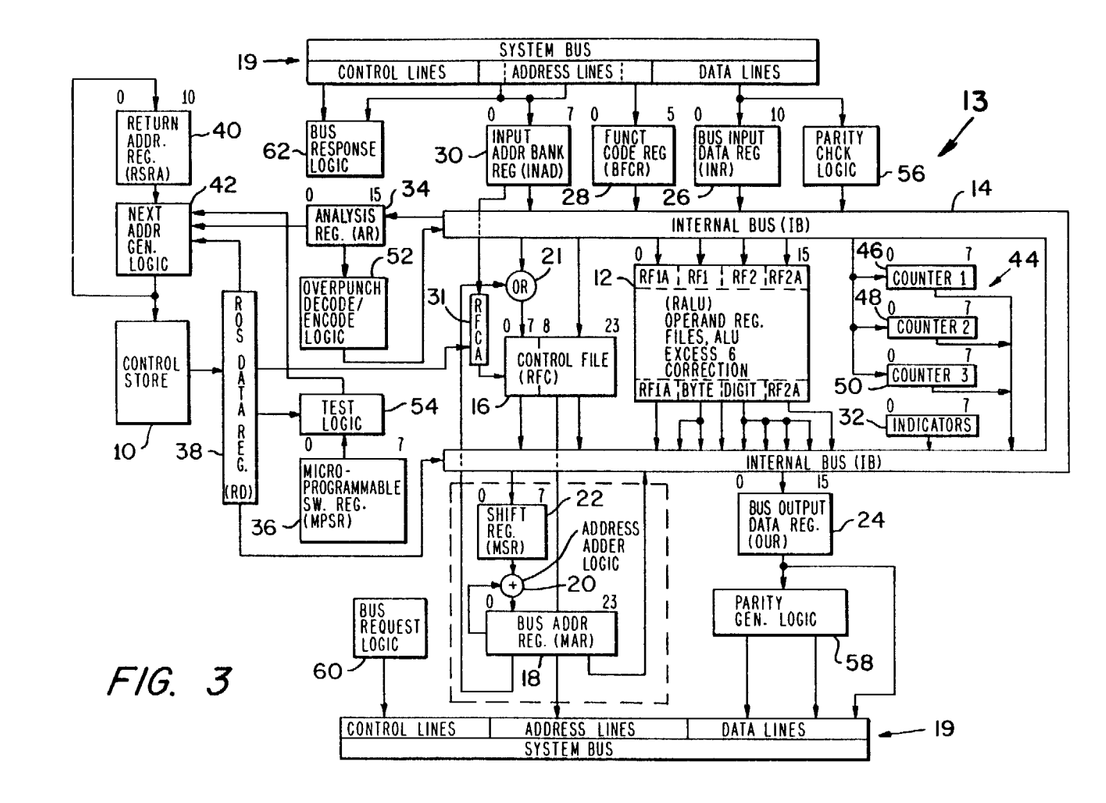
FIG. 3 is a block diagram of the CIP processor of the present invention.

FIG. 3 is a major block diagram of the commercial instruction processor 13 of the present invention, showing all of the major data transfer paths between the processor's registers.

The control store 10 is comprised of a plurality of locations, one for each control store or firmware word. These firmware words directly or indirectly control the processor sequences, data transfer paths, and bus operations.

The operand register files and arithmetic logic unit (RALU) 12 primarily includes two register files, an arithmetic logic unit (ALU) and the associated multiplexers and control registers. Included in the RALU 12 are the operand register files (RF1 and RF2), each containing sixteen sixteen bit locations that are used to buffer operands for execution in the ALU. The ALU input multiplexers and latches are comprised of the following: three 2-to-1 multiplexers (zone selection), two 4-to-1 multiplexers (digit selection), and two 8-bit latches (byte latches). These multiplexers and latches are used to deliver data from the operand register files to the ALU. Data can also be transferred from a current product counter to the ALU or from operand register file 2 to a multiply register. The 8-bit ALU (which is comprised of two 4-bit ALU chips, a carry look-ahead chip, and a carry in/carry out flip-flip) is capable of performing the following logical operations on operands presented at its two inputs: Binary Add, Binary Subtract Input 1 from Input 2, Binary Subtract Input 2 from Input 1, Logical OR, Logical AND, Exclusive OR, Set ALU Output Equal to FF, and Clear ALU Output to 00. The RALU is discussed in detail with respect to FIG. 5.

The excess 6 (XS6) correction logic of the RALU is enabled whenever the ALU is in decimal mode, and is used to change the binary output from the adder to the correct decimal digit while modifying the carry output for subsequent operations. XS6 correction is accomplished by using a 32-bit by 8-bit PROM chip, which encodes the corrected three high-order bits of the digit and generates the corrected carry. A digit less than two function is also available on the output of the PROM chip for other controls. The ALU output multiplexer is used to feed either the upper four bits of the adder output or the correct decimal zone bits to the internal bus 14, depending on whether the ALU is operating in binary or decimal mode, respectively. The RALU control logic consists of three registers, which are as follows: RF1A—Register File 1 Address Register, RF2A—Register File 2 Address Register and ALMR—ALU Mode Control Register. These registers, in conjunction with several microinstructions, control all operations within the RALU. Besides the registers and control described previously, there are two other registers that are classified as RALU registers. These registers are the current product counter (CPRC) and the multiplier register (MIER), to be discussed hereinafter.

Still referring to FIG. 3, the control file 16, also referred to as register file C (RFC), is a 16 location by 24 bit random access memory (RAM) that is primarily used to store all instruction related information that originates from the CPU 11 (e.g., task words, data descriptors, effective addresses, etc.). The control file also contains several work locations which are used by the processor (CIP) firmware. The control file 16 receives bits 0–7 from either internal bus 14 or bus address register (MAR) 18 via OR logic multiplexer 21. The bus address register (MAR) 18 and address adder logic 20 shall now be discussed. The MAR register 18 is a 24-bit address register that is primarily used to address the system bus 19. It is comprised of an 8-bit, two-input multiplexer register on the low end and a 16-bit incrementor/decrementor on the high end. The multiplexed input into the lower eight bits is from either the control file 16 or the output of the address adder 20. The address adder 20 is an 8-bit two's complement adder unit that is primarily used for incrementing or decrementing the contents of the bus address register 18. The inputs to the address adder 20 are the low-order eight bits of the bus address register and the 8-bit shift register (MSR) 22. The shift register (MSR) 22 is an 8-bit universal shift register that can be loaded from the internal bus 14 and is capable of shifting left or right by one bit (i.e., open-end shift with zero-fill). The shift register functions as an input to the address adder 20 for incrementing or decrementing the bus address register 18. In addition, bit 0 of the shift register 22 can be loaded into the ALU carry-in flip-flop, which is useful during execution of the conversion instructions.

The bus output data register (OUR) 24 is a 16-bit data register that is used to transfer data onto the bus 19 data lines. It is loaded from the internal bus 14 with either the lower or upper byte or the entire 16-bit word. The bus input data register (INR) 26 is a 16-bit data register that is used to receive data from the bus 19 data lines. The contents of the input data register can be unloaded onto the internal bus 14.

The input function code register (BFCR) 28 is a 6-bit register that is used to store the function code when the CIP accepts any bus 19 input or output command. Subsequently, firmware examines the contents of the function code register 28 and executes the specified command. The input address bank register (INAD) 30 is an 8-bit register that is used to store the high-order eight memory address bits that are received over the bus 19 address lines. The high-order eight address bits contain the memory module address and are transmitted by the CPU 11 as the result of a so-called IOLD command or an output effective address function code. The low-order 16-bits of the memory address are received over the bus 19 data lines and are strobed into the INR register 26, forming the required 24-bit main memory address.

Figure 4:
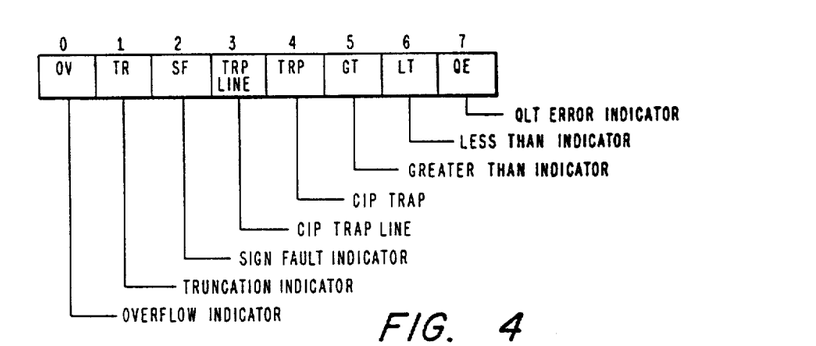
FIG. 4 illustrates the contents of one of the registers of the CIP processor of the present invention.

The CIP indicator register 32 is an 8-bit storage register in which each bit can be individually set or reset. The indicator register bit configuration is shown in FIG. 4. The TRP and TRP LINE indicators are used by the CIP 13 for internal processing only and are not software visible. The TRP LINE (CIP trap line) indicator is used to inform the CPU 11 of an existing CIP trap condition and is transmitted over the bus 19 via the external trap signal. When set, the TRP (CIP trap) indicator allows the CIP to accept only input commands from the CPU.

The analysis register (AR) 34 is a 16-bit register that is primarily used to control microprogram branches (masked branches) and the over-punch byte encode/decode logic. This register is loaded with the entire 16-bit word from the internal bus 14. The microprogrammable switch register (MPSR) 36 is an 8-bit register in which each bit can be individually set or reset under microprogram control. Each bit within the MPSR register 36 is used as a flag to facilitate microprogramming (i.e., firmware can test each of the register bits and perform branch operations, depending on the test results). Some of these bits are also used to control certain CIP 13 hardware functions.

The ROS data register (RD) 38 is a 52-bit storage register that is used to store the control store output (firmware word) for the current firmware cycle. The microprogram return address register (RSRA) 40 is an 11-bit register that is loaded from the output of the next address generation (NAG) logic 42 and is used to store the microprogram return address when executing a firmware subroutine. The register file C address multiplexer/selector (RFCA) 31 is a 4-bit, 2-to-1 selector that is capable of addressing one of the 16 locations contained within register file C (i.e., control file) 16. This selector 31 selects a combination of the function code register 28 and either counter (1) 46 or selected bits of the ROS data register 38. The CIP counters 44 include three 8-bit up/down counters 46, 48 and 50 that are defined respectively as Counter 1 (CTR1), Counter 2 (CTR2), and Counter 3 (CTR3). These counters are loaded/unloaded via the internal bus 14. The contents of each counter are available for test and branch operations.

The overpunch byte decode/encode logic 52 includes two 512-location by 4-bit PROM chips that are used to decode/encode the contents of the analysis register (AR) 34. The byte being decoded is obtained from AR bits 1 through 7 and the digit being encoded is obtained from AR bits 4 through 7. The decode/encode operation is accomplished by using AR bits 1 through 7 to address a specific PROM location. The contents of the specified PROM location are coded to conform to either: (1) the decoded digit, its sign, and its validity, or (2) the encoded overpunched byte. The MPSR 36-bit 4 specifies whether a decode or encode operation is performed, while MPSR bit 1 indicates the sign of the digit being encoded. Also, the output of the overpunch byte decode/encode logic is available on both halves of the internal bus 14.

The CIP test logic 54 selects one of 32 possible firmware test conditions for input to the next address generation logic 42. The true or false condition of the function being tested controls bit 50 of the control store next address field (i.e., sets or resets bit 50, depending on the condition of the tested function). The next address generation (NAG) logic 42 included in the CIP 13 uses one of the following five methods to generate the next firmware address: direct address, test and branch, masked branch, major branch, or subroutine return. Direct Address: this method is used when an unconditional branch is performed to the next sequential control store location. This is accomplished by using bits 41 through 51 of the control store word to form the next address. These bits comprise the next address (NA) field, which can directly address any of the available control store locations. Test and Branch: this method is used when a 2-way conditional branch (test condition satisfied) is performed within a firmware page (a firmware page being a 128-location segment within the control store). This is accomplished by using control store bits 41, 42, 43, 44 and 50 to select a test condition. Then, depending on the condition of the tested function, a branch is performed to one of two locations. The branch operation performed under this method is modulo 2 (i.e., the two possible branch addresses are two locations apart). The modulo 2 address is developed as follows: (1) if the test condition is satisfied, bit 9 of the address is set to a one, or (2) if the test condition is not satisfied, bit 9 of the address is set to a zero. Masked Branch: this method is normally used when branching on the contents of the analysis register (AR) 34 or certain other conditions, and provides branching to 2, 4, 8 or 16 locations within the same firmware page. Major Branch: this method is used when branching within a firmware page (128 words). A CPU/CIP interface routine uses this method to perform the required 16-way branch on the contents of the function code register 28. (INB Major Branch) and other control functions (EOP Major Branch). Subroutine Return: this method is used to return the firmware to the next odd or even control store location after execution of a firmware subroutine. The return address is obtained from the return address (RSRA) register 40, and must be stored in this register 40 prior to execution of the specified subroutine.

The internal bus 14 is 16-bits wide and is primarily used to transfer data between CIP registers, including locations within the register files. The internal bus receives data from several sources as shown in FIG. 2. Outputs from the internal bus 14 are fed to various registers within the CIP.

The parity checking logic 56 is coupled between the bus 19 and internal bus 14 and is used to check the parity of the incoming data. The parity generator logic 58, on the other hand, is used to generate the correct parity bit for transfer over the bus 19.

The bus request logic 60 and the bus response logic 62 are utilized for the purpose of enabling the CIP to gain access to the bus 19 and to respond to any requests to gain access to the CIP. Logic 60 and 62 are described in U.S. Pat. No. 3,993,981.

Figure 5:
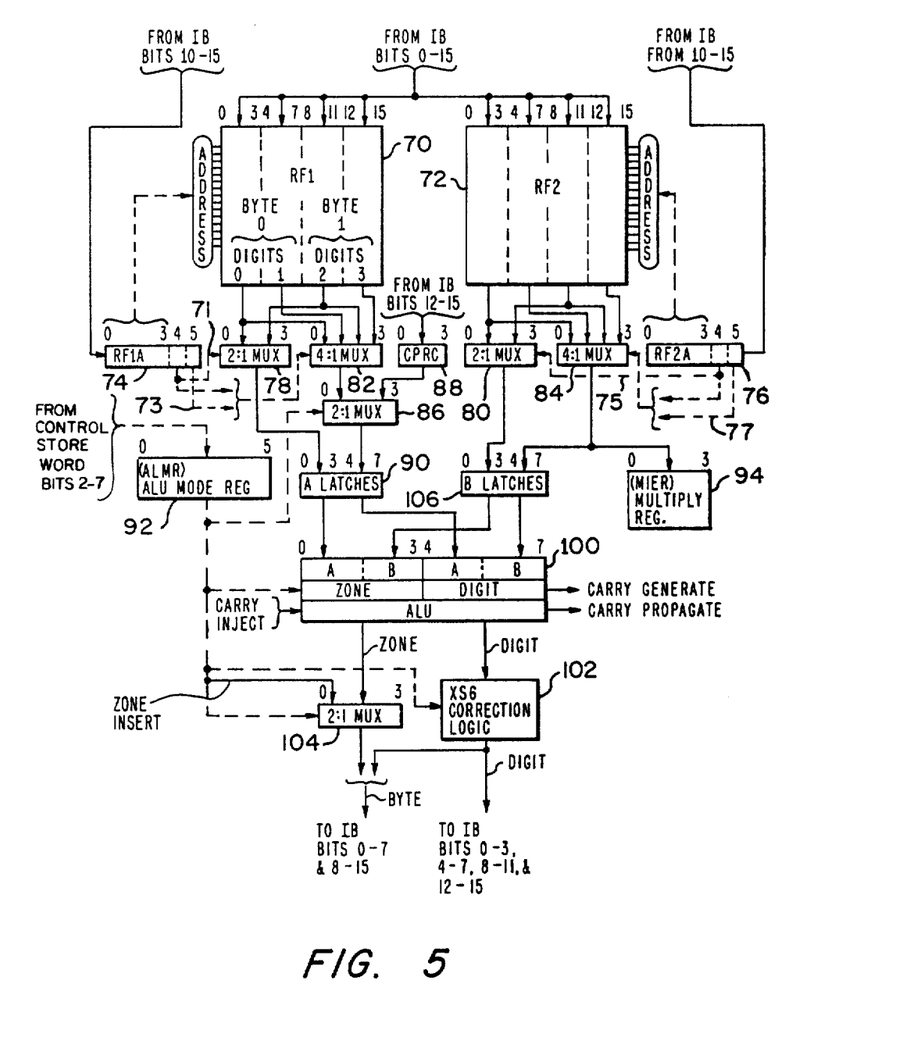
FIG. 5 is a detailed block diagram of the arithmetic unit of the present invention.

FIG. 5 is a major block diagram of the RALU 12, showing all major data transfer paths and control lines. The control lines are shown as dashed lines for ease of understanding its operation. For convenience, the description of the RALU is divided into seven areas: Operand Register Files, ALU Input Multiplexers and Latches, Arithmetic Logic Unit, XS6 Correction Logic, ALU Output Multiplexer, RALU Control Logic, and Miscellaneous RALU Registers. Operand register files RF1 70 and RF2 72 each consist of four RAM chips that are used as temporary storage for CIP operands. Addresses for each of the register files are supplied by two 6-bit address registers (RF1A 74 and RF2A 76, respectively). Bits 0 through 3 of each address register supply the address of the location within the associated register file, while the low order bits provide for byte and digit selection at the output of the register file. Both of these address registers can be incremented or decremented by 1, 2 or 4 (i.e., by digits, bytes, or words). As shown in FIG. 5, the output from each register file is fed to the inputs of two multiplexers (i.e., a pair of multiplexers for each register file) that select between zone and digit information. The selection is accomplished by bits 4 and 5 of the associated address register. Bit 4 selects whether bits 0 through 3 or 8 through 11 (from the register file) are fed to the output of the 2-to-1 multiplexers 78 or 80 respectively, while bit 5 selects the register file bits that comprise the digit being fed to the output of the 4-to-1 multiplexers 82 or 84 respectively.

The various registers and multiplexers are coupled for control by various control lines, shown as dotted lines, and including, for example, control lines 71, 73, 75 and 77. A third 2-to-1 multiplexer 86 is used to select whether the contents of the current product counter (CPRC) 88 or the digit from RF1 is delivered to the A latches 90. This multiplexer is controlled by the ALMR register 92. The ALU input latches, A latches 90 and B latches 106, receive both zone and digit information from the ALU input multiplexers, and latch the data into the register files during write operations. The outputs from the latch circuits feed the zone and digit information to the left and right sides of the ALU, respectively.

The current product counter (CPRC) is a 4-bit decimal up/down counter that is primarily used during execution of decimal multiply and divide operations. The multiplier register (MIER) 94 is a 4-bit binary up/down counter that is primarily used during decimal multiply and divide operations. The ALU mode control register (ALMR) 92 is a 6-bit control register that is used to control all ALU operations. The register file 1 address register (RF1A) 74 is a 6-bit address register that performs two functions: (1) provides addresses for register file 1 (70), and (2) controls two of the three ALU input multiplexers associated with register file 1. The register file 2 address register (RF2A) 76 is a 6-bit address register that performs two functions: (1) provides addresses for register file 2 (72), and (2) controls the ALU input multiplexers associated with register file 2. All arithmetic logic unit (ALU) 100 operations are performed in either the decimal or binary mode. Decimal mode is used when operating with decimal digit information, while binary mode is used for byte (Alpha) operations. Both modes of operation also control the excess 6 (XS6) correction logic 102 and the inputs to the carry flip-flop. In decimal mode, the carry flip-flop is loaded with the carry from the low-order four bits of the ALU, while in binary mode, it is loaded with the carry from the eight bits of the ALU for subsequent arithmetic operations. The carry flip-flop is loaded under microprogram control when a carry must be propagated for subsequent operations. In addition, the carry flip-flop can be loaded from the MSR register, and set or reset under microprogram control.

The XS6 correction logic 102 has one 32-bit by 8-bit PROM chip and the associated control logic to correct the high-order three bits from the digit output of the ALU. XS6 correction is performed if: (1) the ALU is in decimal add mode and a decimal carry is encountered or the digit output of the ALU 100 is greater than 9, and (2) in the decimal subtract mode, if a borrow is encountered (i.e., absence of a carry from the digit portion of the adder). The PROM chip has five address lines. Three of these lines consist of the three high-order bits from the digit output of the ALU, while the other two address lines indicate the type of operation being performed (i.e., add correction, subtract correction, or no correction). The coded contents of the PROM chip are the three high-order corrected bits of the digit, the corrected decimal carry, and the digit less than 2 condition.

The ALU output multiplexer 104 selects between the upper four bits of the adder output and the corrected decimal zone bits for delivery to the internal bus. The configuration of the zone bits (for decimal mode) depends on whether ASCII or EBCDIC data is being used (i.e., if ASCII data is being used, the zone bits are forced to a value of 3; if EBCDIC data is being used, the zone bits are forced to a value of F).

The RALU controls consist of registers RF1A 74, RF2A 76, and ALMR 92 plus various RALU related microinstructions. In addition, the ALU carry flip-flop is under microprogram control. The carry flip-flop can be precleared or preset, (as required), by the respective microinstructions, and can be loaded from: (1) the 4-bit digit carry for decimal operations, (2) the 8-bit binary carry for binary operations, or (3) bit 0 of the MSR register 22 during execution of conversion instructions. The ALMR register 92, which controls all ALU operations, is loaded from control store bits 2 through 7. Bit 0 specifies whether the ALU operates in decimal or binary mode; i.e., whether the carry out of the ALU is from bit 4 (digit carry) or bit 0 (binary carry). Bit 0 also controls both the ALU correction (XS6) for decimal operations and the ALU output multiplexer 104; the multiplexer determines whether the high-order four bits of the ALU or the forced zone bits are gated to the internal bus 14. Bits 1, 2 and 3 are used to control operations within the ALU. Bit 4 specifies whether the zone bits forced to a value of 3 or F (i.e., for ASCII data, the zone bits are forced to a value of 3; for EDCDIC data, the zone bits are forced to a value of F). Bit 5 specifies whether the selected digit from register file 1 or the contents of the current product counter 88 are gated to the latches 90 associated with the left side of the ALU. Register RF1A provides the address and controls for register file 1 and the associated ALU input muliplexers. Register RF2A provides the addresses and controls for register file 2 and the associated ALU input multiplexers.

The control file 16 is divided into two sections: the upper section (bits 0 through 7) and the lower section (bits 8 through 23). Each section of the control file can be loaded as follows: RFC lower from the internal bus (bits 0 through 15), RFC upper from the internal bus (bits 0 through 7), RFC lower from the internal bus (bits 0 through 15), and RFC upper from the bus address register 18 (bits 0 through 7). The functions used to implement the above operations have an address associated with them, which address corresponds to the RFC 16 location being loaded. This address originates from either the function code register 28 or the control store 10. Thus, the RFC address is directly related to the type of data being delivered by the CPU 11, or as indicated by the function code.

As discussed hereinbefore, FIG. 3 depicts a major block diagram of the commercial instruction processor. The elements 21, 16, 31, 22, 20 and 18 together are referred to as the address conrol unit, which shall be referenced herein as the ACU. The CIP instructions are directly executed by the CPU 11 and the CIP 13. The CPU basically extracts the instructions from main memory 17 and determines whether they are CIP instructions, generates all information for executing this instruction and transfers this information to the CIP so that the CIP can execute the instructions. Thus, basically the CPU extracts the instruction, processes the addresses and sends all the instruction related information to the CIP for the instruction to be executed. The amount of information is dependent on the type of instruction to be executed. Generally, a CIP instruction contains an op code, a data descriptor which defines the data, and the address in main memory where that data is located. Such instruction further includes another data descriptor which is related to a second operand, and if necessary, a third data descriptor related to a third operand. The CIP instructions can have up to a maximum of three operands, and each operand can have up to three units of information associated with it, these units being the effective address in memory which points to the operand, secondly, the data descriptor which defines the type of data in that operand, and thirdly, the length of the operand which could be located in a CPU register if so specified by the data descriptor.

The number of units of information for the instruction could vary from anywhere between 5 and 10, including the instruction op code which is called the taskword. The CIP needs to have a capability of storing this information and remembering what type of information it is, whether the information transferred from the CPU is a data descriptor or the address, and using this information during the execution of the CIP instruction by the CIP.

The addresses received from the CPU are used by the CIP to address main memory, to fetch the operand for the instructions. For this purpose, the CIP needs to have the capability for either incrementing the addresses in main memory or decrementing such addresses in main memory. The data descriptor portion of the information is used by the CIP to determine the type of data which the CIP is manipulating. The length which, if not included in the data descriptor, is received from the contents of a CPU register and is used by the CIP to indicate the length of the field to be operated on.

The task word received indicates the instructions being executed.

During the loading of information from the CPU, if the CIP wants to determine what the information was, whether a data descriptor, an effective address or the contents of a register, it would require the CIP more time to test the type of information and load this information into predetermined locations inside a storage unit. This testing for the type of information being sent to the CIP by the CPU would penalize the execution time of the CIP instruction. Accordingly, a system is desirable whereby the CIP can dynamically load the information from the CPU as it comes over from the CPU irrespective of what the information is, and load it into predefined locations in the storage element inside the CIP to be used subsequently by the execution firmware doing the execution process of the instruction. This functional requirement of loading the information as it is sent over the system bus from the CPU and storing it for later use by the CIP firmware and also being able to increment or decrement the memory addresses as operands are being fetched from main memory for their execution is accomplished by the address control unit (ACU) of the CIP.

The address control unit consists of a control file (RFC), the bus address register (MAR), a shift register (MSR), along with a memory address adder 20. It also uses inputs from the function code register (BFCR) 28, and the input address bank register (INAD) 30 through the internal bus 14 as an input to the RFC 16. The basic description of these units has been discussed hereinbefore.

Figure 6:
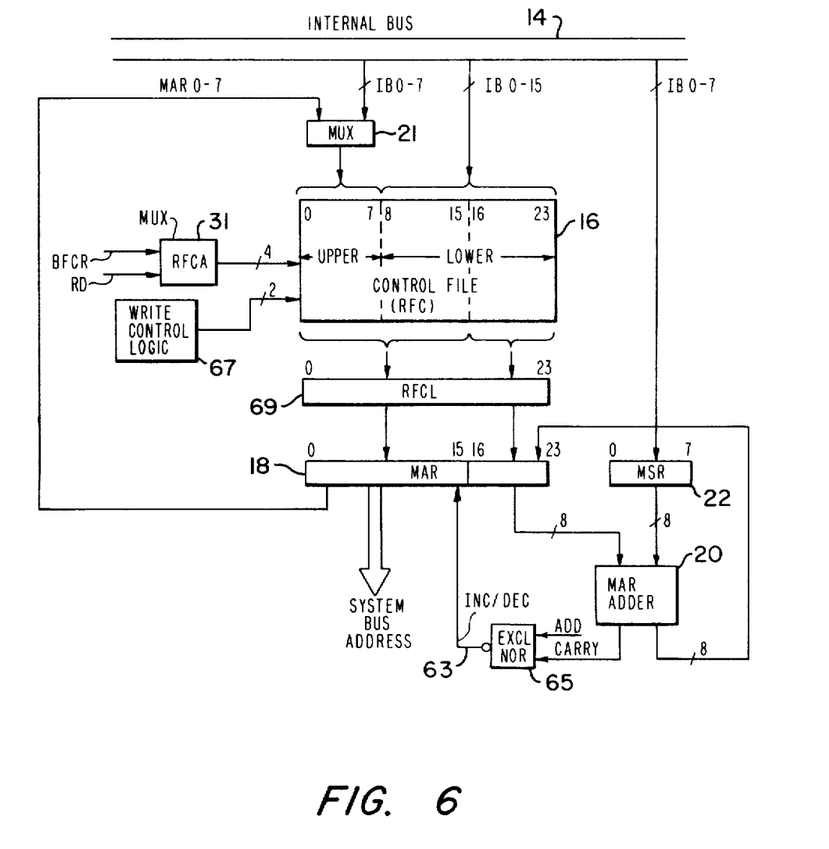
FIG. 6 is a detailed block diagram of the address control unit of the CIP processor of the present invention.

FIG. 6 is a more detailed block diagram of the address control unit. Control file RFC 16 is used as the storage element for the informatin coming from the CPU. It takes its inputs from the internal bus IB 14, the 16 bits going directly into bits 8 through 23 of the RFC, and bits 0 through 7 of the RFC being loaded either from the internal bus, bits 0 through 7, or from the bus address register MAR 18, bits 0 through 7, via the multiplexer 21. Associated with the RFC is its address multiplexer RFCA 31, which uses for its inputs data directly from the control store word (RD), or a function of the function code register BFCR 28.

The function code register (BFCR) 28 (FIG. 3) is 6-bits wide and is designed to monitor address bits 18 through 23 for a function code. This function code data is strobed into the BFCR register via signal BMYACK when the response logic 62 acknowledges a CIP command. The function code indicates the type of data being transferred to the CIP and also the command.

The input address register 30 (also FIG. 3) is an 8-bit register that stores the upper eight bits from the address (BSAD00 through BSDA07). This data is strobed into the INAD 30 register via signal BMYACK when the response logic acknowledges a CIP command. The output of the INAD register 30 is available on the internal bus for use within the CIP. The CPU sends the high order 8 bits of a 24 bit address via the address lines of bus 19 (sending the low order 16 bits on the data lines) when the effective address is transmitted to the CIP.

The 4 bits at the output of the RFCA address multiplexer 31 are used to address the 16 locations inside the control file RFC 16. Also associated with this control file is the write control logic 67 (FIG. 6) which has two control lines controlling the loading of the control file RFC, and more particularly one line for controlling the loading of the upper 8 bits 0 through 7, and the other controlling the loading of the lower 16 bits, 8 through 23. The output of the RFC control file goes into an RFC latch 69, which is 24 bits wide. This latches the information being read out from the RFC for further usage. The memory address register (MAR), which is also called the bus address register 18, receives its input from the RFC latch 69. The MAR register 18 as shown is divided into two portions, one being bits 0 through 15 and the other being bits 16 through 23. Bits 0 through 15 are loaded directly from bits 0–15 of the RFC latch, whereas bits 16 through 23 are loaded either from bits 16–23 of the RFC latch, or from the output of the memory address adder (MAR ADDER) 20.

The MAR adder 20 has as its input the low order 8 bits, bits 16 through 23, of the MAR register 18, and the 8 bits of the shift register (MSR) 22. The shift register (MSR) 22 can be loaded from bits 0 through 7 of the internal bus 14. The carry output of the MAR adder 20 is coupled through an exclusive NOR gate 65 with a function or signal indicating that an add operation is being performed. This generates an output signal on line 63 which controls the incrementing or decrementing of the high order 16 bits of the MAR register 18. A detailed description of the different elements of FIG. 6 shall now be discussed.

As shown in FIG. 6, the control file is divided into two sections: the upper section (bits 0 through 7) and the lower section (bits 8 through 23). Each section of the conrol file can be loaded as follows: RFC lower from the internal bus (bits 0 through 15), RFC upper from the internal bus (bits 0 through 7), and RFC upper from the system bus address register (bits 0 through 7). The functions used to implement the above operations have an address associated with them that corresponds to the RFC location being loaded. This address originates from either the function code register 28 or the control store. Thus, the RFC address is directly related to the type of data being delivered by the CPU, as indicated by the function code. The RFC address, when originating from the function code register 28, also uses counter 1 (46 in FIG. 3), indicating that the information being received from the CPU is related to data descriptor 1, 2, or 3. The counter is incremented whenever the task word or a data descriptor is received from the CPU since the data descriptor is the last piece of information received for an operand. The function codes received for the corresponding information are as follows: 07—task, 09—Effective Address (EA1, EA2 and EA3), OB—Register (R4, R5 and R6), OF—DATA Descriptor (DD1, DD2), and IF—Last Data Descriptor (DD2, DD3).

When loading information from the CPU bits 3 and 4 of the 6 bit function code register BFCR (28) along with two bits of the counter (bank count) are used to address the RFC 16. Initially, the bank count is cleared to zero. Thus, when the task is received, the address is 0011 (3). The two zeros correspond to the bank count and the two ones correspond to bits 3 and 4 of BFCR 28. After the task word is received, the bank count is incremented to 01 and when EA1 is sent by the CPU, the RFC address will be 0100. The two low order zeros correspond to the BFCR, bits 3 and 4, for function code of 09 for EA1. The internal organization of the RFC is shown in FIG. 7.

Figure 7:
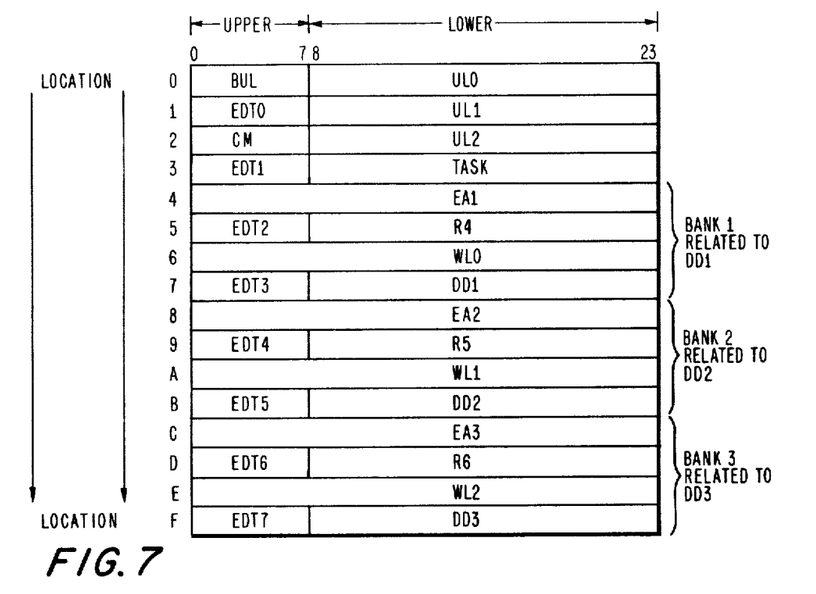
FIG. 7 illustrates the internal organization of the control file of the processor of the CIP present invention.

FIG. 7 illustrates the internal organization of the control file. UL0, UL1 and UL2 are 16-bit utility locations, WL0, WL1 and WL2 are 24-bit work locations. BUL is an 8-bit work location in the upper half of RFC.

Figure 8:
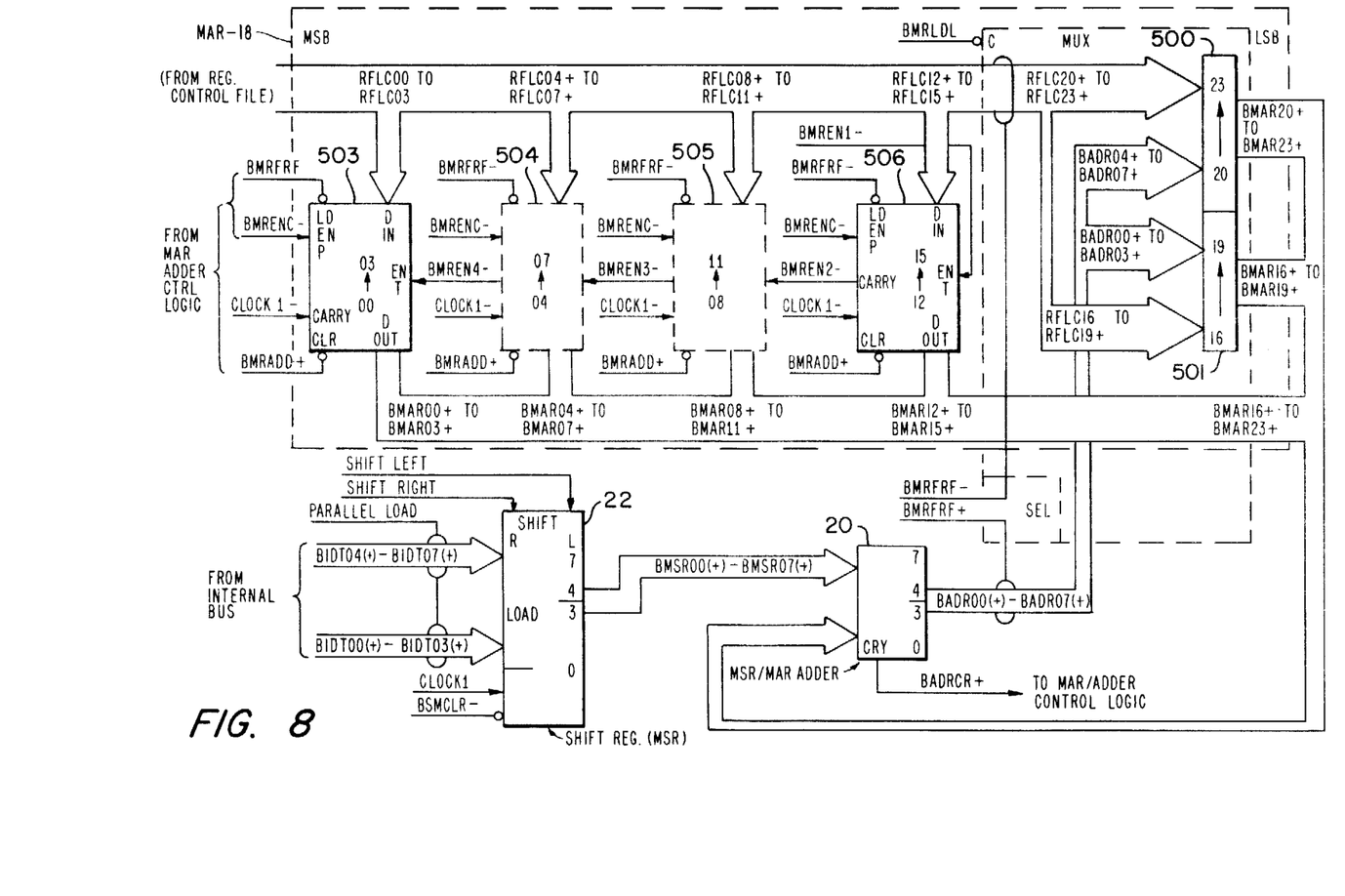
FIG. 8 is a detailed diagram of the address register and adder of the CIP processor of the present invention.

Each of the preceding locations can be used as a work location by the CIP firmware. EDT0 through EDT7 are used during the Edit instructions and contain edit table entries 1 through 8. These locations can also be used as 8-bit work locations for other instructions. CM is the CIP mode register (also referred to as M3). TASK corresponds to the task (instruction) received from the CPU. DD1, DD2 and DD3 are 16-bit storage locations that reflect Data Descriptors 1, 2 and 3 from the CPU. EA1, EA2 and EA3 are 24-bit storage locations that reflect the effective addresses of the three operands. R4, R5 and R6 are 16-bit storage locations that reflect the contents of the corresponding registers in the CPU. The bus address register 18 provides a 24-bit address for transission over the bus 19 during a bus read cycle. The detailed logic for the bus address register 18 is shown in FIG. 8. It consists of four 4-bit binary up/down counters 503 through 506, and two multiplexer register chips 500 and 501, which form the 24-bit address as shown in FIG. 8. Associated with the MAR is an 8-bit binary adder called the memory address adder 20 and an 8-bit shift register MSR 22 which allows the adder to increment the MAR by a count of up to $255_{10}$ and to decrement it by a count of up to $256_{10}$.

The four 4-bit binary counters 503 through 506 (bits 0 through 15): (1) form the two most significant bytes of the address, (2) receive address data from the register control file (RFC) when their load signal BMRERF- is true, and (3) are incremented or decremented in an add or subtract operation when their enable count (BMRENC-) signal is true and there is a carry from the address adder 20 (BMREN1- is true). They are incremented by 1 when the add (BMRADD-) signal is true and are decremented by 1 when the subtract (BMRSUB-) signal is true. The two 4-bit multiplexers 500 and 501 form the least significant byte of the address and receive data from either the RFC (BMRFRF- is true) or adder (BMRFRF- is false) during the negative transition of their clock input lines via load signal BMRLDL-. The 8 bit address adder 20 also serves the purpose of adding a byte of data to a base address during the execution of a translate instruction. The byte being translated is loaded into the MSR 22. The shift capability of the MSR register 22 is useful for the execution of a binary to decimal conversion instruction.

Figure 9:
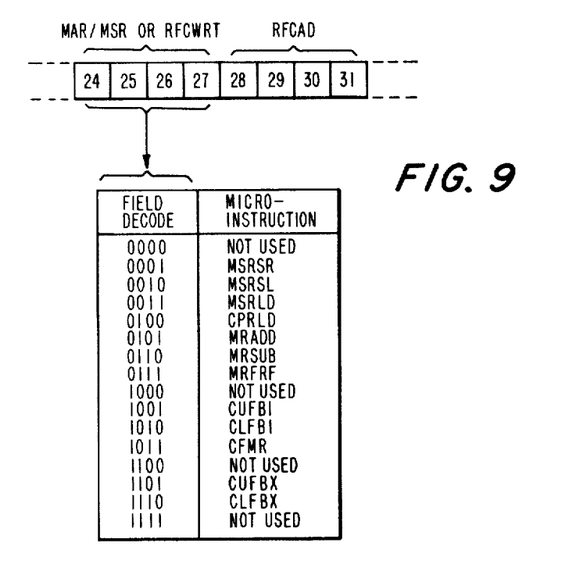
FIG. 9 illustrates a portion of the firmware word of the CIP processor.

The control of the ACU is accomplished by bits 24 through 31 of the firmware (ROS) control word. The coding for this field is shown in FIG. 9.

The MAR/MSR field or RFCWRT field (RFCWRT) consists of bits 24 through 27 of the firmware word, and is used to control the MAR register, MSR register, and the address adder hardware. The specific controls provided by this field are: (1) loading of the MAR or MSR register, (2) adding or subtracting MAR and MSR, (3) shifting of the MSR register, and (4) loading of the control file C (RFC) 16.

The RFCAD field consists of bits 28 through 31 of the firmware word, and is used to directly address the control file (RFC) for all read and write operations with one exception. When data associated with a write operation originates from the system bus 19, the RFC address is controlled by the function code portion of the command received from the CPU.

The microinstructions relative to MAR and MSR registers are as follows: (1) MRADD—perform add operation between MAR (bits 16 through 23) and MSR (bits 0 through 7), delivering result to MAR (bits 16 through 23); if sum of MAR (bits 16 through 23) and MSR (bits 0 through 7) is greater than 255, increment MAR (bits 0 through 15), (2) MRSUB—perform add operation between MAR (bits 16 through 23) and MSR (bits 0 through 7); result is delivered to MAR (bits 16 through 23); if sum of MAR (bits 16 through 23) and MSR (bits 0 through 7) is less than zero, decrement MAR (bits 0 through 15) by 1 (MSR should contain a 2's complement number), (3) MRFRF—load bus address register from register file C (MAR is loaded from the location within the register file C specified by bits 28 through 31 of the control store word), (4) MSRSR— shift MSR register one bit to the right with zero fill into most significant bit, (5) MSRSL—shift MSR register one bit to the left with zero fill into least significant bit and (6) MSRLD—load MSR (bits 0 through 7) from bits 0 through 7 of internal bus.

The microinstructions relative to register file C are as follows: (1) CFMR—load register file C from MAR register, (2) CUFBX—load register file C (upper 8 bits) from input address register, (3) CLFBX—load register file C (lower 16 bits) from input data register, (4) CLFBI—load register file C (lower 16 bits) from internal bus, and (5) CUFBI—load register file C (upper 8 bits) from internal bus. It should be noted that for CUFBX and CLFBX the data is loaded via the internal bus while the address is controlled by the contents of BFCR.

Figure 10:
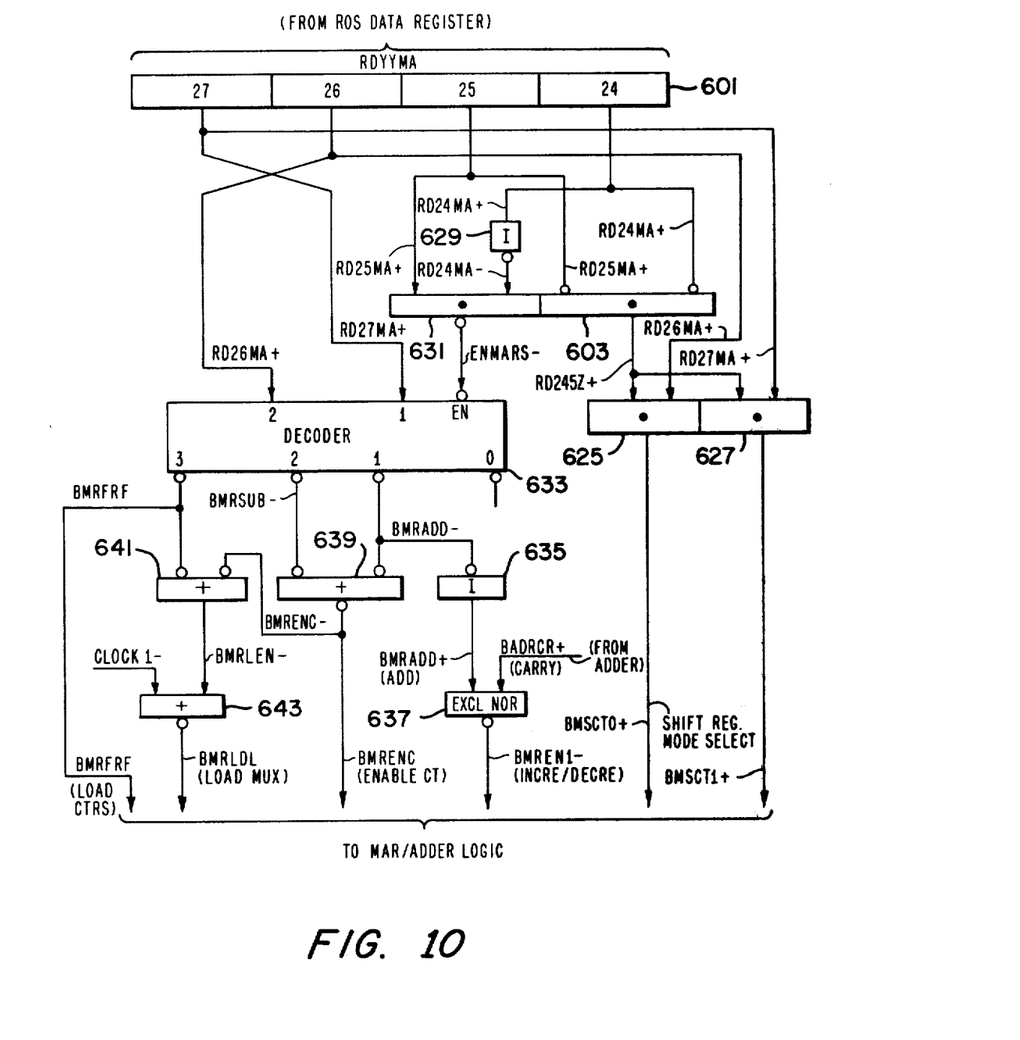
FIG. 10 illustrates the control logic for the address register and adder of the CIP processor.

FIG. 10 shows the control logic for controlling the MAR 19, the shift register 22, and the bus adder 20 as shown in FIG. 8. As shown on FIG. 9, bits 24, 25, 26 and 27 are used to generate different functions to control the elements 18, 20 and 22. These bits, 24, 25, 26 and 27, are shown in FIG. 10 in block 601. When bits 24 and 25 are zero, the bits 26 and 27 are directly used to control the shift register 22. Referring to FIG. 10, when bits 24 and 25 are off, i.e., a binary zero, the output of the AND gate 603 is true (binary one), which indicates that bits RD24 and 25 are zero. When bits 24 and 25 are off, and bits 26 and 27 are passed through the two AND gates 625 and 627, the two functions BMSCT0+ and BMSCT1+ are generated. These two functions are directly used to control the shift register 22. When bits 26 and 27 are 00 respectively, there is no action performed on the shift register. When it is 01, a shift right command takes place, 10 a shift left and a 11 on those two bits indicates a load function on the MSR 22. When the bits from the internal bus 14, bits 0 through 7, are loaded directly into the shift register 22.

When bit 24 of the control store is off and bit 25 is on, that is, 01, this is used to control the bus address register 18 and the adder 20. In this particular case when bit 24 is off, then the output of the inverter 629 is on, and bit 25 being on forces the output of the NAND gate 631 to be low. Thus, with both inputs RD24MA— and RD25MA+ on, the output from the NAND gate 631 is forced into a low state. This signal ENMARS—, which is enable MAR select, going low, that is to the off state, will enable the decoder 633 to decode the bits 26 and 27 of the control store and generate the four outputs with weights of 0, 1, 2 and 3. In this case, when RD26 and RD27 are both off, that is both zero, the zero output of the decoder 633 goes low. This output is not used by this logic and need not be explained for purposes of this disclosure.

When bit 26 is off, that is a zero, and bit 27 is on, that is a one, the selection of the decoder 633 enables the function BMRADD— to go low, that is a decode of a 1 of bits 26 and 27. This function tells the bus address adder 20 to be in the add mode. Function BMRADD— is passed through an inverter 635 to generate the BMRADD+ signal. This signal is exclusive NORed, via exclusive NOR gate 637, with the signal BADRCR+, which is the carry out of the adder 20, to generate the function BMREN1—, which is the increment/decrement function. This signal BMREN1— controls the increment and decrement of the four increment/decrement counters 503, 504, 505 and 506 of the MAR register 18. It is noted that the signal BMREN1—, which is the output of the exclusive NOR gate 637, is coupled to the low order counter 506 of the four counters of MAR 18.

The function BMRADD— also passes through the OR gate 639 generating the signal BMRENC— which is the enable signal to enable the counters 503 through 506 in a count mode. The other output of the decoder 633 is generated when bit 26 is true, i.e., a 1, and bit 27 is off, which enables the signal BMRSUB— on, output 2 of the decoder 633 to go low, which thereby indicates that the bus address adder 20 is in the subtract mode. This signal is also passed through the OR gate 639 enabling the BMRENC— signal to go low and enabling the counters to count. It should be noted that gate 639 is actually an inverting OR gate, thus it is really an AND gate such that with either one of the input signals thereto going low, forces the output BMRENC— to go low.

Thus, whether the adder 20 is in the add mode or in the subtract mode, in either case, the output of the OR gate 639 goes low enabling the counters 503 through 506 to count up or down depending on the carry out of the adder 20 and whether the mode is the add mode or the subtract mode. Accordingly, if the adder 20 was set up to be in the add mode, then the fact that the add mode and a carry exist, will force the output of gate 637 to to high, thereby forcing the counters 503 through 506 to increment by one. Similarly, if in the subtract mode, which would be indicated by signal BRMRADD+ on the input of the exclusive NOR gate 637 being low, then the absence of a carry which is really a borrow out of the binary adder 20 will force the output of gate 637 to go low. Thus, for the subtract case, both inputs of gate 637 being low will also make the output of gate 637 low, thereby making the counters 503 through 506 count down, thus, the case for the subtract mode. Accordingly, in order to count in the MAR by means of the counters 503 through 506, both outputs BMRENC— and BMREN1— should be in the off state and then, the fact that the mode is either add or subtract, will make the counters count up or down by one. The output BMRENC— of the gate 639 is also coupled to the OR gate 641. With BMRENC— going low, this will force the output (BMRLEN—) of the OR gate 641 to also go low. Signal BMRLEN— is used as the load input of the multiplexer registers 500 and 501.

The fourth output of the decoder 633, BMRFRF, indicates load the MAR from the register file C. This is enabled when both bits RD26 and RD27 are high, i.e., a one. In this particular case, the output 3 of decoder 633 goes low and enables the loading of the counters 503 through 506 directly from the output of the RFCL 69 coupled to the register file C. In addition, when signal BMRFRF— is in the zero state, this will also force the output of the OR gate 641 to go low, thereby enabling the clock input on the multiplexer registers 500 and 501 via the NOR gate 643 as a result of being NORed with the clock signal of the CIP. The output of the NOR gate 643 goes high when both inputs thereof go low, thereby forcing the loading of data into the multiplexer registers 500 and 501. The selection of the data to be loaded into these multiplexer registers is controlled by the function BMRFRF—, which is the output 3 of decoder 633. Thus, when BMRFRF— is in the zero state, it will select the output of the register file C latch 69 to be selected and loaded into the multiplexer registers 500 and 501. For the case where signal BMRFRF— is in the one state, which is indicated by the fact that there is no loading of the bus address register from the register file, it will select the output of the adder 20 to be loaded into the multiplexer registers 500 and 501. It should be noted that the clock which enables the loading of the multiplexer registers 500 and 501 first has to go high and when the clock switches to the low state, the output of the NOR gate 643 will go low, and it is this low going transition which actually provides the enabling function with respect to such multiplexer registers.

Having described the invention, what is claimed as new and novel and for which it is desired to secure Letters Patent is:

1. A data processing system comprising:
   A. a first data processor;
   B. a second data processor;
   C. means for coupling said first and second data processors for the receipt of data and instructions by said second data processor from said first data processor;
   D. a main memory for storing information, said main memory being connected to said first and second data processors; and
   E. said second data processor comprising
      1. control store means, having a plurality of commands stored therein, operative to control the operation of said second data processor,
      2. means for storing a function code included in a said instruction received by said second data processor,
      3. a control file comprising a plurality of locations for storing said data received from said first data processor,
      4. first address means for addressing a location in said control file with either a said command from said control store or a said function code received by said means for storing from said first data processor, and
      5. second address means for addressing said main memory with the contents of the location addressed by said first address means.

2. A system as in claim 1 further comprising:
   A. means, responsive to said second address means, for fetching said information from said main memory for use by said second data processor; and
   B. means, included in said second data processor, for changing the value of the contents of the location addressed by said first address means simultaneously with the operation of said means for fetching.

3. A system as in claim 1, said second data processor further comprising:
   A. a memory address register coupled for receipt of said contents of the location addressed by said first address means; and
   B. means for storing a portion of the contents of said memory address register in a said location in said control file.

4. A system as in claim 1, said second data processor further comprising:
   A. means for indicating that said data and instructions are to be received by said second data processor from said first data processor; and
   B. means, responsive to said means for indicating, for enabling said first address means to address a said location in said control file by use of said function code.

5. A system as in claim 1, said second data processor further comprising:
   A. means for indicating that a said command included in said control store is to be executed; and
   B. means, responsive to said means for indicating, for enabling said first address means to address a said location in said control file by use of said command from said control store.

6. A system as in claim 1 wherein each said location in said control file includes a first portion and a second portion, said second data processor further comprising:
   A. means for storing said data and instructions in said first portion;
   B. means for receiving address information from said first data processor; and
   C. means for storing said address information in said second portion.

7. A system as in claim 6, said second data processor further comprising means for changing the value of said address information by means of the contents in of the location of said first address control file addressed by said means.

8. A system as in claim 6 wherein said second address means utilizes the contents of said first portion and said second portion to address said main memory.

9. A system as in claim 1 further comprising:
   A. means, responsive to said second address means for fetching said information from said main memory for use by said second data processor; and
   B. means, included in said second data processor, for changing the value of the contents of the location addressed by said first address means simultaneously with the operation of said means for fetching, said means for changing including
      1. means for adding a first number, and a second number, said first number indicative of the address of data in said main memory and said second number corresponding to a portion of the contents of the addressed one of said locations of said control file, and
      2. means, responsive to said means for adding, for incrementing or decrementing the value of the contents of the addressed one of said locations of said control file.

10. A system as in claim 9 further comprising means for replacing said portion of said contents with the result produced by said means for adding.

11. A system as in claim 10 wherein said portion of said contents is the least significant of the entire said contents of the addressed one of said locations of said control file.

* * * * *